United States Patent [19]
Tanaka et al.

[11] Patent Number: 5,666,644
[45] Date of Patent: Sep. 9, 1997

[54] MULTILAYERED END BEARING

[75] Inventors: Tadashi Tanaka; Masaaki Sakamoto; Koichi Yamamoto; Tsukimitsu Higuchi; Kouki Ozaki, all of Nagoya, Japan

[73] Assignee: Daido Metal Company Ltd., Nagoya, Japan

[21] Appl. No.: 347,079

[22] Filed: Nov. 23, 1994

[30] Foreign Application Priority Data

Dec. 28, 1993 [JP] Japan .................. 5-336530

[51] Int. Cl.$^6$ .................. B22F 7/00; B22F 7/04; F16C 33/12

[52] U.S. Cl. .................. 428/553; 428/548; 419/9; 384/912

[58] Field of Search .................. 428/615, 635, 428/643, 644, 646, 647, 648, 548, 553; 419/9, 47, 54; 384/912

[56] References Cited

U.S. PATENT DOCUMENTS

| | | | |
|---|---|---|---|
| 3,869,261 | 3/1975 | Katsuma | 29/196.3 |
| 3,978,803 | 9/1976 | Asano et al. | 113/120 A |
| 3,982,314 | 9/1976 | Ariga et al. | 29/527.4 |
| 4,562,122 | 12/1985 | Hodes et al. | 428/644 |
| 5,432,013 | 7/1995 | Tanaka et al. | 428/643 |
| 5,434,012 | 7/1995 | Tanaka et al. | 428/643 |
| 5,445,896 | 8/1995 | Tanaka et al. | 428/647 |
| 5,460,639 | 10/1995 | Kondoh | 75/231 |

FOREIGN PATENT DOCUMENTS

| | | |
|---|---|---|
| 706672 | 3/1954 | United Kingdom . |
| 2 240 989 | 8/1991 | United Kingdom . |

*Primary Examiner*—John Zimmerman
*Assistant Examiner*—Michael LaVilla
*Attorney, Agent, or Firm*—Browdy and Neimark

[57] ABSTRACT

An end bearing used in an automatic transmission gear having a one-way clutch mechanism having multi-layers comprising a back metal, a copper alloy layer, a tin layer having a thickness of 0.5 to 4 μm and a Cu-Sn intermetallic compound layer having a thickness of 0.5 to 4 μm and having a Microvickers hardness of from 400 to 700, which intermetallic compound layer is positioned just under the tin layer and which intermetalic compound layer is are formed on the copper alloy of such an end bearing. According to the present invention, it is possible to improve anti-seizure characteristics of an end bearing even under a condition of a decrease in the amount of oil supply which decrease occurs in higher engine speed, thus enabling the provision of an end bearing having superior anti-seizure characteristics.

2 Claims, 2 Drawing Sheets

ND BEARING

BACKGROUND OF THE INVENTION

1. Field of the Invention

The present invention relates to an end bearing used in an automatic transmission gear having a one-way clutch mechanism and to a method of manufacturing such an end bearing. More particularly, the invention relates to improvements in conformability and anti-seizure characteristics of an end bearing with a shaft, which improvements are achieved by constructing the end bearing to be multilayered.

2. Description of the Related Art

Conventionally, a double-layered sintered material mainly formed of a bronze alloy and a steel back plate is used for the conventional type of an end bearing. However, the anti-seizure characteristics of the double-layered sintered material deteriorates due to a decrease in the amount of oil supply in accordance with higher engine speed, thus failing to obtain sufficient sliding characteristics even though the material has good load-carrying capacity and good fatigue strength.

SUMMARY OF THE INVENTION

Accordingly, in view of the above background, an object of the present invention is to provide an end bearing which has superior anti-seizure characteristics under more severe lubrication conditions.

According to the invention, a sintered alloy is plated with tin, followed by being heat-treated, thereby allowing tin contained in the tin plated layer to diffuse into the sintered alloy layer. Namely, the present invention provides a multilayered end bearing provided with superior conformability and anti-seizure characteristics, the end bearing being used in an automatic transmission gear having a one-way clutch mechanism, comprising: a steel back plate; a copper alloy layer bonded onto the steel back plate; a Cu-Sn intermetallic compound layer bonded onto the copper alloy layer and having a thickness of from 0.5 to 4 µm and a Microvickers hardness of from 400 to 700; and a tin layer bonded onto the Cu-Sn intermetallic compound layer and having a thickness of from 0.5 to 4 µm, the tin layer being provided for forming a sliding surface of the end bearing.

The end bearing of the invention has wear resistance brought about by the copper alloy layer and improved anti-seizure characteristics brought about by the tin plated layer. This tin plated layer is thin, as much as a few µm, but can obtain superior sliding characteristics over a conventional sintered bronze end bearing. Further, the Cu-Sn intermetallic compound layer obtained by allowing tin contained in the tin plated layer to diffuse into the copper alloy layer has a great degree of hardness, thus providing very good wear resistance. A synergistic effect of this intermetallic layer and the foregoing tin plated layer provides such a multilayered end bearing as having superior conformability and anti-seizure characteristics and good wear resistance, thereby enabling the end bearing to be suitably used under higher engine speed and higher engine output.

According to a first aspect of the present invention, there is provided a multilayered end bearing as described above in which the copper alloy layer of the multilayered end bearing may have a composition consisting essentially of 3–15 wt % Sn, 0.01–1.0 wt % P, and the balance Cu and incidental impurities.

According to a second aspect of the present invention, there is provided a method of manufacturing a multilayered end bearing having superior conformability and anti-seizure characteristics, comprising the steps of: preparing a steel back plate having a copper alloy layer formed thereon; plating the surface of the copper alloy layer with a tin coating having a thickness of from 0.7 to 7.0 µm; and maintaining the resultant copper alloy layer plated with the tin coating for a predetermined duration at a temperature of from 150° to 300° C. and allowing tin contained in the tin plated portion to diffuse into the copper alloy layer.

DESCRIPTION OF THE PREFERRED EMBODIMENT

Figure 1:
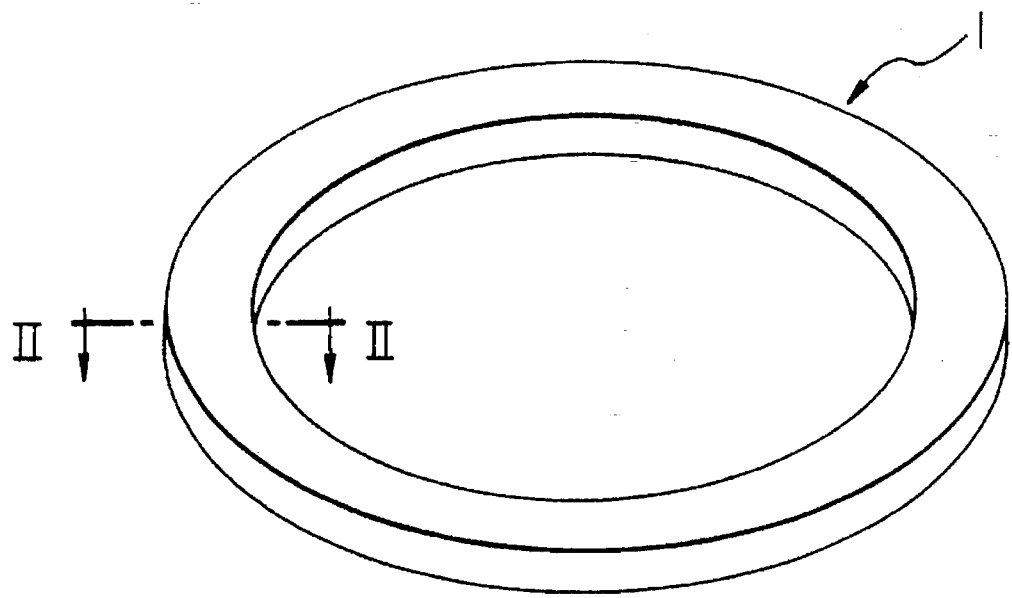
FIG. 1 is a perspective view of an end bearing embodying the invention.

Before explaining specific examples, the general idea of an end bearing of the present invention will be described.

A tin coating film (5) is formed on the surface of a copper alloy (3) of an end bearing (1). This tin coating film can be formed by any desired method, for example, electroplating, vacuum deposition, ion plating and melt plating. The temperature and the duration for heat-treating such an end bearing having a tin coating film formed thereon should be controlled in such a degree that tin contained in the tin coating film, the surface of which is in contact with the copper alloy, can partially diffuse into the copper alloy layer (3) bonded onto a backing metal plate (2) of steel, while tin contained in the tin coating film used for the sliding surface of the end bearing maintains its conformability and anti-seizure characteristics. For example, the end bearing is heat-treated at a temperature of 200° C. for approximately from 2 to 4 hours (preferably 2.5 to 3.5 hours). The end bearing having a tin coating film formed thereon is thus heat-treated so as to permit tin contained in the tin coating film, the surface of which is in contact with the copper alloy, to partially diffuse into the copper alloy, thereby forming a diffusion layer (4) of intermetallic compounds of copper and tin such as $Cu_6Sn_5$, $Cu_3Sn$ and etc. on the copper alloy, which results in the presence of the coating film of tin on this diffusion layer (4). Such a state gives rise to a further secure connection between the tin coating film (5) and the copper alloy layer (3) and permits the sliding surface of the end bearing to be hardened by the diffusion layer, the hardness of the hardened diffusion layer being preferably 600 to 700 Hr. In consequence, there can be provided a multilayered end bearing comprising, a tin layer, a diffusion layer of an intermetallic compound consisting of tin and copper, and a copper alloy layer. Such an end bearing is free from seizure and wearing at the early period of use of the engine and is even capable of improving its anti-seizure characteristics at the later period of use of the engine. That is, a contact between the end bearing of the present invention and a shaft is actually performed by a contact between a tin coating film and the shaft. Tin, which is a soft metal having good self-lubricating characteristics, can bring about good conformability and anti-seizure characteristics with the shaft. Also, even though the tin coating film is worn, the presence of the hardened diffusion layer under the tin coating film provides a greater degree of hardness for the overall layer, which can thus be protected from such wear and can bring about superior wear resistance.

A description will now be given of specific examples of the present invention.

Each of powders having particles size not more than 250 μm having chemical compositions of embodiments 1 and 2 and of comparison examples 1 and 2 (all of which are explained below) was put on a steel backing plate to cover the steel back metal having a thickness of 0.8 to 1.0 mm and a width of 150 mm, which powder spread on the back metal was then sintered at a temperature of 700° to 900° C. for 10 to 30 minutes under a reducing atmosphere, and then they were rolled so that a sintered composite material was formed. The composite material was again subjected to sintering and rolling so that a sintered bimetal was produced which had a total thickness of 0.9 mm and a backing metal thickness of 0.72 mm.

A tin coating film was formed on the surface of the sintered bimetal, which tin coating film had a thickness of about 2 μm (the tin film thickness in the end bearing being not limited to this value). A composite material having a tin coating film formed thereon was placed in a heat treatment furnace. The temperature in the furnace was raised to approximately 200° C., and the composite material was maintained therein for a predetermined duration described below. Then, frictional and wear specimens having a multi-layer structure according to the present invention were prepared. The wear test was then performed on those specimens to compare the specific load of seizure occurrence of examples of the present invention and those of comparative examples. Table 1 shows the thrust-type Suzuki-method friction and wear test conditions employed for this test and Table 2 indicates the test results.

1. FIRST EXAMPLE

A Cu-5% Sn-0.05% P alloy layer was plated with a tin coating having a thickness of approximately 2 μm according to an electroplating method, followed by being thermally treated at a temperature of approximately 200° C. for 4 hours. Thus, a tin layer having a thickness of about 1.5 μm and a copper-tin intermetallic compound layer having a thickness of about 1.5 μm, which was placed just under the tin layer, were formed for the sliding surface of an end bearing. The hardness of this intermetallic compound measured 520 by the Microvickers hardness.

2. SECOND EXAMPLE

A Cu-11% Sn-0.2% P alloy layer was plated with a tin coating having a thickness of approximately 2 μm according to an electroplating method, followed by being thermally treated at a temperature of approximately 200° C. for 4 hours. Thus, a tin layer having a thickness of about 1.5 μm and a copper-tin intermetallic compound layer having a thickness of about 1.5 μm, which was placed just under the tin layer, were formed for the sliding surface of an end bearing. The hardness of this intermetallic compound measured 680 by the Microrickets hardness.

3. FIRST COMPARATIVE EXAMPLE

Cu-5% Sn-0.05% P alloy without plating

4. SECOND COMPARATIVE EXAMPLE

Cu-11% Sn-0.2% P alloy without plating

Table 2 verifies that anti-seizure characteristics are improved in the first and second examples in comparison with the first and second comparative examples, respectively.

Figure 2:
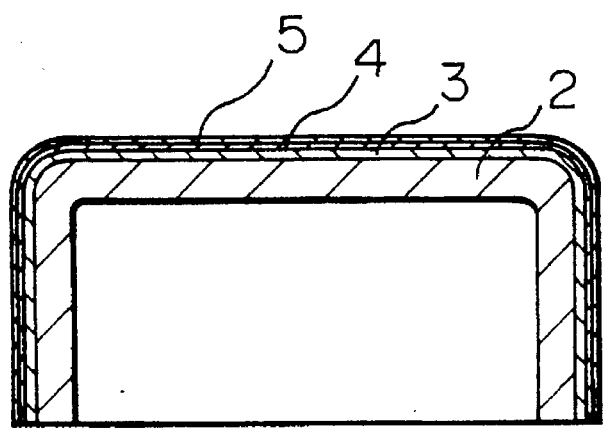
FIG. 2 is a sectional view taken along line II—II in FIG. 1.
Figure 3:
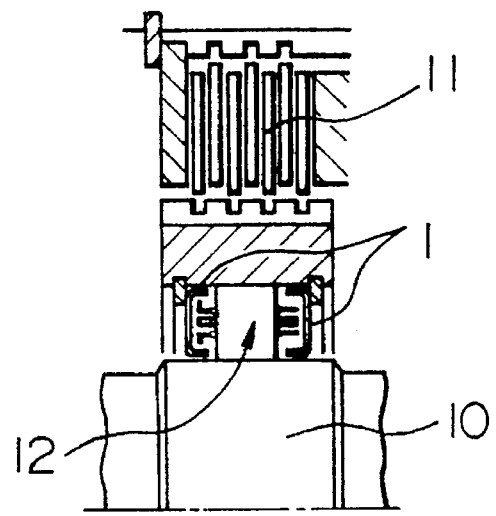
FIG. 3 is a partial sectional drawing showing main parts of one way clutch mechanism in which the end bearing of the invention is mounted.
Figure 4:
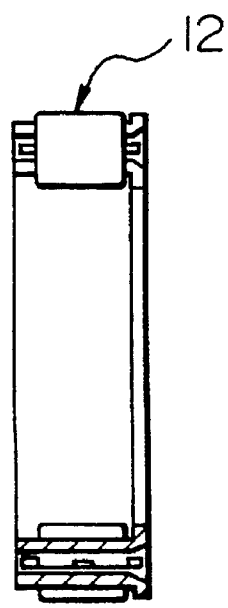
FIG. 4 is a drawing showing a bearing portion in the one-way clutch mechanism onto which the end bearing of the invention is to be mounted.
Figure 5:
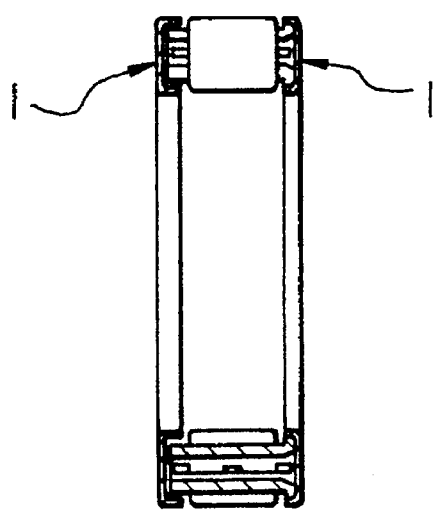
FIG. 5 is a drawing showing the bearing portion in the one-way clutch mechanism onto which the end bearing of the invention is mounted.

Next, by using each of the same materials and conditions as in the embodiments 1 and 2, a multi-layer strip was manufactured and it was worked into an end bearing (1) disclosed in FIGS. 1 and 2. The end bearings (1) was mounted in a one-way clutch mechanism having clutch plates (11) and a bearing portion (12) as shown in FIGS. 3, 4 and 5. The end bearings were then tested, and it was confirmed that, in the end bearing of the invention, it became possible to improve anti-seizure property even under a condition in which there occurred decrease in lubricant oil amount due to the higher rotation of a shaft of an engine, which decrease in lubricant oil amount had caused seizure in conventional end bearings.

TABLE 1

| | Test conditions | Unit |
| --- | --- | --- |
| Testing machine | Suzuki-method friction and wear tester | |
| Specimen shape | Flat plate (50 × 50) | (mm) |
| Specific load and time | Accumulative 3 MPa: Every 30 minutes | |
| Revolution | 2400 | (rpm) |
| Circumferential speed | 3.1 | (m/s) |
| Lubrication | Automatic oil | |
| Test temperature | Starting: Room temperature | (°C.) |
| Shaft material | S55C quenched | |
| Shaft roughness | 0.3 | Rmax. (μm) |
| Shaft hardness | 500–600 | (Hv 10 kg) |

TABLE 2

| | Specific load of seizure occurrence (MPa) | | | |
| --- | --- | --- | --- | --- |
| | 0    5 | 10 | 15 | 20 |
| 1. First Example | | | | |
| 2. Second Example | | | | |
| 3. First Comparative Example | | | | |
| 4. Second Comparative Example | | | | |

What is claimed is:

1. A multilayered end bearing for use in an automatic transmission gear having a one-way clutch mechanism, consisting essentially of:

a backing plate of steel having an upper surface;

a copper alloy, layer comprising a sintered composite of metal powders, and bonded to said upper surface of said backing plate, said copper alloy layer having a composition consisting essentially of 3 to 15 wt % Sn, 0.01 to 1.0 wt % P, the balance Cu and incidental impurities;

a Cu-Sn intermetallic compound layer formed during heat treatment at 150° to 300° C. and bonded to said copper alloy layer, said intermetallic compound layer having a thickness of from 0.5 to 4 μm and a Microrickets hardness of from 400 to 700; and a tin layer bonded to said Cu-Sn intermetallic compound layer, said tin layer having a thickness of from 0.5 to 4 μm, said tin layer constituting a sliding surface of said end bearing.

2. A multilayered end bearing according to claim 1 made by plating said copper alloy layer with a tin coating having a thickness of from 0.7 to 7.0 μm, and heating said tin coated copper alloy layer bonded to said steel backing plate at a temperature of 150° to 300° C. for a time sufficient, in the range of about 2 to 4 hours, for tin in said tin coating to diffuse into said copper alloy layer to provide said Cu-Sn intermetallic layer and said tin layer bonded thereto.

* * * * *